L. W. Lathrop,
Motor.
No. 108,915. Patented Nov. 1, 1870.

Witnesses:
C. Raettig
Alex F. Roberts

Inventor:
L. W. Lathrop
pr. Munn & Co
Attorneys.

UNITED STATES PATENT OFFICE.

LEBBEUS W. LATHROP, OF POUGHKEEPSIE, NEW YORK.

IMPROVEMENT IN MOTIVE-POWER APPARATUS.

Specification forming part of Letters Patent No. 108,915, dated November 1, 1870.

*To all whom it may concern:*

Be it known that I, LEBBEUS W. LATHROP, of Poughkeepsie, in the county of Duchess and State of New York, have invented a new and Improved Motive-Power Apparatus; and I do hereby declare that the following is a full, clear, and exact description thereof, which will enable others skilled in the art to make and use the same, reference being had to the accompanying drawings, forming part of this specification.

This invention relates to improvements in apparatus for obtaining and applying power for light machinery—such as sewing-machines, turning-lathes, churns, and the like; and it consists in a pair of shafts arranged parallel to each other, and geared together so that one turns faster than the other, and a long india-rubber or other elastic band or cord wound or coiled on the shaft which moves slowest, then attached to the other and wound onto it from the first in a way to stretch the band through its whole length, and so that when the shafts are released motion will be imparted to them by the spring, which will wind back onto the first shaft, all as hereinafter described.

Figure 1:
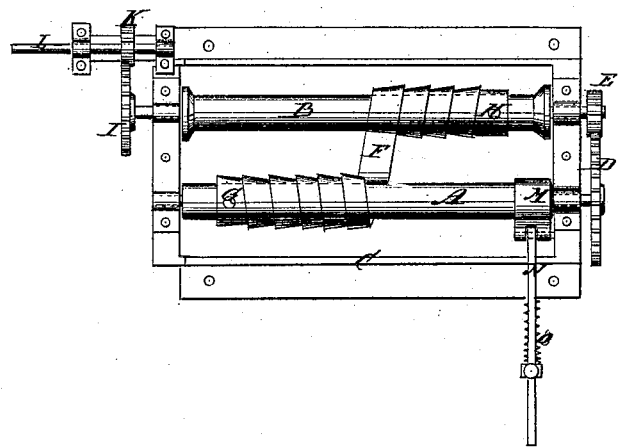
Figure 2:
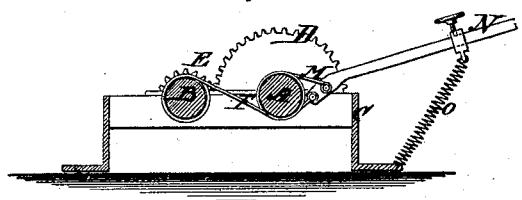

Figure 1 is a plan view of my improved machine, and Fig. 2 is a transverse section of the same.

Similar letters of reference indicate corresponding parts.

A is one of the said shafts, and B the other. They are arranged on any suitable frame, C, and geared together at one end by the large wheel D and the small one E.

F is the india-rubber belt, (or it may be a round cord.) It is fastened at G to the shaft and wound or coiled spirally thereon, as shown, the coil extending from end to end of the shaft, or nearly so. Then the other end is attached to the shaft D at H, and the shafts being turned by hand, for which a hand-crank or other means is to be provided, the belt will be wound off from A and onto B, and at the same time stretched as much as is due to the difference in speed of the shafts. As the shafts revolve in opposite directions the band winds from the top of one to the bottom of the others. The band or cord thus stretched will of course have a tendency to turn the shafts back again and wind back from shaft B to A, the same being in the same measure as the power expended in stretching the belt, and a part of this force may be utilized in any of the known ways in driving other machines, which may be geared to the shafts in any preferred way—for instance, by the wheels I K and the shaft L.

The motion which, when unrestrained, will be very rapid, may be regulated by a friction-strap, M, lever N, and a spring, O, or by an escapement and pendulum, or any other suitable means, as preferred.

I claim—

The elastic belt F, shafts A B, and differential gear D E, combined and arranged as and for the purpose described.

The above specification of my invention signed by me this 24th day of June, 1870.

LEBBEUS W. LATHROP.

Witnesses:
    GEO. W. MABEE,
    ALEX. F. ROBERTS.